United States Patent [19]

Bryg et al.

[11] Patent Number: 6,108,721

[45] Date of Patent: Aug. 22, 2000

[54] METHOD AND APPARATUS FOR ENSURING DATA CONSISTENCY BETWEEN AN I/O CHANNEL AND A PROCESSOR

[75] Inventors: William R. Bryg, Saratoga, Calif.; Monish S. Shah; Thomas V. Spencer, both of Ft. Collins, Colo.

[73] Assignee: Hewlett-Packard Company, Palo Alto, Calif.

[21] Appl. No.: 09/107,008

[22] Filed: Jun. 29, 1998

[51] Int. Cl.[7] .................................................. G06F 13/00
[52] U.S. Cl. .............................. 710/22; 710/24; 710/26; 710/33; 710/55; 714/141; 714/142; 714/143; 714/144
[58] Field of Search .................................. 710/22, 33, 55, 710/24, 26; 711/141, 142, 143, 144

[56] References Cited

U.S. PATENT DOCUMENTS

| | | | |
|---|---|---|---|
| 5,613,153 | 3/1997 | Arimilli et al. ............................. | 710/1 |
| 5,778,437 | 7/1998 | Baylor et al. ........................... | 711/141 |
| 5,796,979 | 8/1998 | Arimille et al. ......................... | 711/142 |
| 5,890,217 | 3/1999 | Kabemoto et al. ..................... | 711/141 |
| 5,918,070 | 6/1999 | Moon et al. ............................ | 710/129 |
| 6,003,106 | 12/1999 | Fields, Jr. et al. ...................... | 710/129 |

Primary Examiner—Thomas C. Lee
Assistant Examiner—Tammara Peyton

[57] ABSTRACT

In a method and apparatus that ensures data consistency between an I/O channel and a processor, system software issues an instruction which causes the issuance of a transaction when notification of a DMA completion is received. The transaction instructs the I/O channel to enforce coherency and then responds back only after coherency has been ensured. Specifically, a DMA_SYNC transaction is broadcast to all I/O channels in the system. Responsive thereto, each I/O channel writes back to memory any modified lines in its cache that might contain DMA data for a DMA sequence that was reported by the system as completed. The I/O channels have a reporting means to indicate when this transaction is completed, so that the DMA_SYNC transaction does not have to complete in pipeline order. Thus, the I/O channel can issue new transactions before responding to the DMA_SYNC transaction.

23 Claims, 3 Drawing Sheets

… …

METHOD AND APPARATUS FOR ENSURING DATA CONSISTENCY BETWEEN AN I/O CHANNEL AND A PROCESSOR

BACKGROUND OF THE INVENTION

1. Technical Field

The invention relates to computer systems. More particularly, the invention relates to a method and apparatus for ensuring data consistency between an I/O channel and a processor in a computer system.

2. Description of the Prior Art

In prior art computer systems, an input/output (I/O) adapter (also referred to as a channel) performed read and write operations to memory. This approach was inefficient. Accordingly, modern prior art I/O adapters include a cache to improve system memory latency and bandwidth for direct memory access (DMA) transactions. In servicing DMA requests, an I/O adapter considers a request to be completed once the cache is updated. The cache is then kept coherent. In most cases, this protocol is acceptable.

However, in some computer systems, such as the PA-RISC architecture manufactured by Hewlett-Packard Company of Palo Alto, Calif., processor data requests are coherent, i.e. all caches in the system are effectively checked to see where the most up-to-date copy of a particular piece of data is located, but in such systems, processor instruction requests, e.g. fetching code instructions, are considered to be non-coherent because the contents of the instructions should not be modifiable. Thus, the system software is designed to force coherency only in the event that the instructions are modified. Accordingly, instruction requests read whatever is in memory. As a result, instruction requests can be serviced faster than comparable data requests because coherency does not have to be checked.

Unfortunately, a problem arises when there is a DMA sequence that writes a series of instructions into memory, i.e. where the instructions are first written into the memory's cache. In such case, the system tells a processor, typically via an interrupt transaction, that it has finished the DMA sequence. If the processor then branches to the newly written series of instructions, the non-coherent read might find a previous (i.e. stale) version of the data in memory if the new DMA version of the data is still in the I/O adapter's cache.

One method of solving this problem is to make the instruction read transaction a coherent transaction, so that it is able to find the new DMA version in the I/O adapter's cache. However, this approach slows down all other instruction read transactions.

Another method of solving this problem is to modify the I/O adapter so that it writes any modified line from its cache to memory when it receives a notification of DMA completion. However, this technique is difficult to implement because there are several different ways that an I/O device can notify a processor that a DMA sequence is complete, and one of those ways itself resembles a portion of a DMA sequence.

It would be advantageous to provide a method and apparatus that ensures data consistency between an I/O channel and a processor without unnecessarily complicating computer system operation and/or degrading computer system performance.

SUMMARY OF THE INVENTION

The invention provides a method and apparatus that ensures data consistency between an I/O channel and a processor without unnecessarily complicating computer system operation and without degrading computer system performance. In the preferred embodiment of the invention, the system software issues an instruction which causes the issuance of a transaction when notification of a DMA completion is received. The transaction instructs the I/O channel to enforce coherency and then responds back only after coherency has been ensured.

Specifically, the preferred embodiment of the invention employs a transaction which is implemented in the Hewlett-Packard Company PA-RISC architecture, and which is referred to as the DMA_SYNC transaction. Uniquely, the DMA_SYNC transaction is broadcast to all I/O channels in the system. Responsive thereto, each I/O channel writes back to memory any modified lines in its cache that might contain DMA data for a DMA sequence that is already reported by the system as completed. In a system that uses a pipelined transaction protocol, each I/O channel has a separate sideband reporting means to indicate when this transaction is completed. Therefore, the DMA_SYNC transaction does not have to be completed in pipeline order. In this way, the I/O channels can issue new transactions before responding to the DMA_SYNC transaction.

DETAILED DESCRIPTION OF THE INVENTION

The invention provides a method and apparatus that ensures data consistency between an I/O channel and a processor without unnecessarily complicating computer system operation and without degrading computer system performance. In the preferred embodiment of the invention, the system software issues an instruction which causes the issuance of a transaction when notification of a DMA completion is received. The transaction instructs the I/O channel to enforce coherency and then responds back only after coherency has been ensured.

Specifically, the preferred embodiment of the invention provides a transaction which is implemented in the Hewlett-Packard Company PA-RISC architecture, and which is referred to as the DMA_SYNC transaction. Uniquely, the DMA_SYNC transaction is broadcast to all I/O channels in the system. Responsive thereto, each I/O channel writes back to memory any modified lines in its cache that might contain DMA data for a DMA sequence that is already reported by the system as completed.

In a system that uses a split transaction protocol, normal response reporting means can be used or extended in a manner known to those skilled in the art to inform a requestor of the completion of the transaction.

In a system that uses a pipelined protocol, each I/O channel has a separate sideband reporting means to indicate when this transaction is completed. Therefore, the DMA_SYNC transaction does not have to be completed in pipeline order. In this way, the I/O channels can issue new transactions, specifically the necessary write-backs, before responding to the DMA_SYNC transaction. Otherwise, the DMA_SYNC would wait for completion of the write-backs, and the write-backs could not complete until the prior DMA_SYNC is out of the pipeline.

In the preferred embodiment of the invention, there are several phases of operation that proceed in pipeline order. The pipeline herein is considered a flexible pipeline because the execution of different phases of operation may be stretched out in time or not, as appropriate. Typically, a transaction goes through a particular phase of operation after a previous transaction has completed that phase of operation. At a certain point, it is possible to split or defer a read transaction, such that the read is no longer operating in strict pipeline order. But it is not possible in this particular protocol to split a write transaction because write transactions are always in pipeline order.

The preferred embodiment of the invention includes a separate reporting means by which responses for the DMA_SYNC transactions will be received and by which a DMA_SYNC transaction may be split, such that the system is no longer operating in strict pipeline order. Other reporting means will work, and will be obvious to those skilled in the art.

Figure 1:
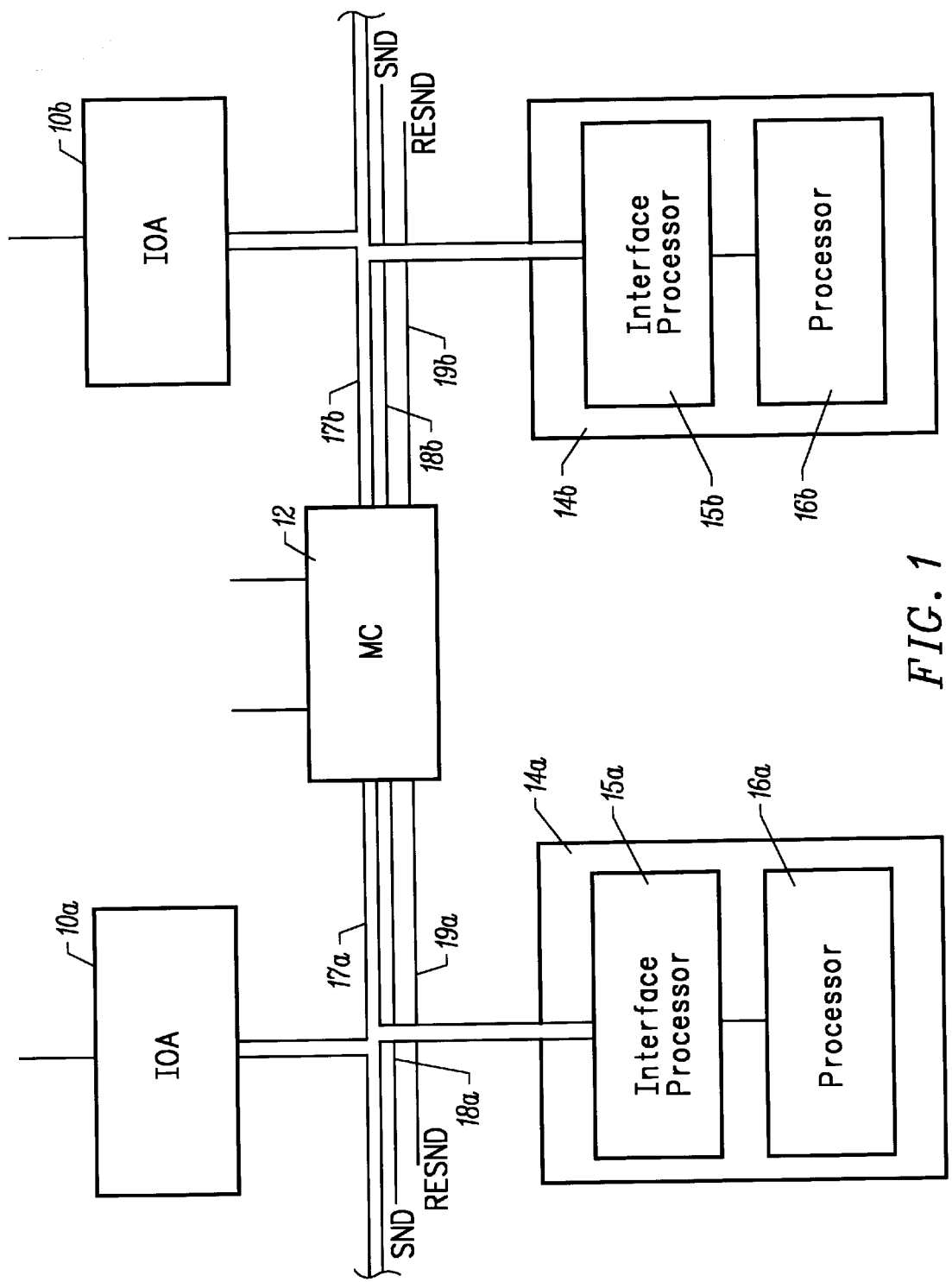
FIG. 1 is a block schematic diagram of a system architecture according to the invention.

FIG. 1 is a block schematic diagram of a system architecture according to the invention. The preferred embodiment of the invention is shown in connection with a two bus architecture, although the invention is readily practiced in a single bus system.

In a two bus architecture, a two-port memory controller 12 is arranged between a first bus 17a and a second bus 17b. Each bus includes at least one respective module such as a processor module 14a and 14b or an I/O adapter module. Each bus may also include at least one channel or I/O adapter 10a/10b by which the system establishes any of a plurality of input and output connections, for example to various peripheral devices and networks.

Architecturally, the DMA_SYNC transaction causes all modules to check whether all parts of a DMA transaction that are reported as completed, can be guaranteed as being completed. It is only necessary for each I/O adapter to respond (on its own behalf) to the DMA_SYNC transaction, and flush offending lines from its cache. Typically, the operating system guarantees that the DMA input for code pages is always line-aligned and contains full lines, so that the lines that must be written back are guaranteed to have had its last byte written. The I/O adapter need only write-back lines that are fully written to by the DMA input and are thus already marked for writing back to memory. Logically, the I/O adapter puts a marker in the write-back queue when the marker reaches the front of the queue. Each I/O controller also has a fully associative cache 24/25. When the DMA_SYNC transaction is seen on the bus, the information is passed up to the cache within the I/O controller. The cache takes a snapshot of those memory lines that must be written-back to fulfill the requirements of the DMA_SYNC transaction. The cache keeps track of when these memory lines are written-back and either subtracts or marks them off from the snapshot until they are all out of the cache. Once the DMA_SYNC transaction is completed, the I/O adapter deasserts a SND signal (discussed below).

A module can consider its portion of the DMA_SYNC completed when a later read code transaction would see any data from the required writebacks.

The invention provides a signal, referred to as SyncNotDone (SND) that is asserted at the snoop phase of a transaction (as discussed in greater detail below). The SND signal is a separate signal that is propagated over an independent signal path 18a/18b and that is instrumental in indicating when the DMA_SYNC transaction is finally completed, i.e. when SND is deasserted.

Starting in the snoop phase of a local DMA_SYNC transaction, SND may be asserted to indicate that the DMA_SYNC transaction is still in progress. SND may remain asserted after the end of the snoop phase and, if necessary, the response phase of the DMA_SYNC transaction. This arrangement frees the system bus for transactions which may be needed to complete the DMA_SYNC transaction. It is necessary to allow various transactions to continue in spite of the fact that a DMA_SYNC transaction is proceeding because, for example, the I/O adapter may have to issue other transactions to complete the DMA_SYNC transaction. In the normal case, the processor issues the DMA_SYNC transaction which is forwarded, as appropriate, on the system bus. The I/O adapters issue zero or more writebacks. When all necessary write-backs are to a point that the memory is responsible for the transaction, the I/O adapter can release the SND, thereby indicating that the DMA_SYNC transaction is completed.

The preferred embodiment of the invention supports a two bus system (although any number of buses may be provided in a system which incorporates the invention), so that there can be two DMA_SYNC transactions at a time in the system. Thus, there can be one DMA_SYNC transaction that was originated from one bus and another DMA_SYNC transaction that was originated from the other bus, so that each bus can initiate a DMA_SYNC transaction. While there is an active DMA_SYNC transaction that was started from a particular bus, the processors on that bus watch and do not launch a new DMA_SYNC transaction until that previous DMA_SYNC transaction is completed. Accordingly, the preferred embodiment of the invention provides two sideband signal paths, i.e. SND 18a/18b for a local DMA_SYNC transaction and REMSND 19a/19b for a remote DMA_SYNC transaction. It will be appreciated by those skilled in the art that the invention is readily applied to single bus systems, in which case the REMSND signal path is not necessary.

An I/O adapter can determine whether a transaction was launched by a processor on the local bus or by the memory controller on the local bus. In the two bus system, each bus has an SND and a REMSND sideband signal path. The processor, looks at the SND signal path. If a transaction is a local transaction, the I/O adapter drives the SND signal path until the DMA_SYNC transaction is completed with all of its write-backs as necessary.

Two similar signal paths are provided on each bus. Thus, the processors on the remote bus may perform operations related to a DMA_SYNC transaction, although the I/O adapter on the remote bus does respond via the REMSND signal path. The I/O adapter is able to tell whether the DMA_SYNC transaction originated on the local bus or on a remote bus. After completion of the DMA_SYNC transaction, the I/O adapter responds via the SND signal path if the DMA_SYNC transaction was a local transaction, and via the REMSND signal if the DMA_SYNC transaction was a remote transaction. Between the time that DMA_SYNC gets to the snoop phase on the originating bus and when DMA_SYNC gets to the snoop phase on the remote bus, the memory controller asserts SND on the originating bus because it is not legal yet for the remote I/O adapters to assert REMSND. After the DMA_SYNC reaches the snoop phase on both buses, the memory controller looks at the REMSND signal from the remote bus and logically propagates it through to the SND signal path on the originating bus, thus forwarding a response back to the originating bus. When the processor finally sees that the SND signal path is released after the snoop phase (discussed below—see FIG. 3), the DMA_SYNC transaction is completed and the processor continues its operation. This approach can be extrapolated to support any number of buses using the SND and REMSND signals. In such systems, a locally generated DMA_SYNC is forwarded to all other buses.

Figure 2:
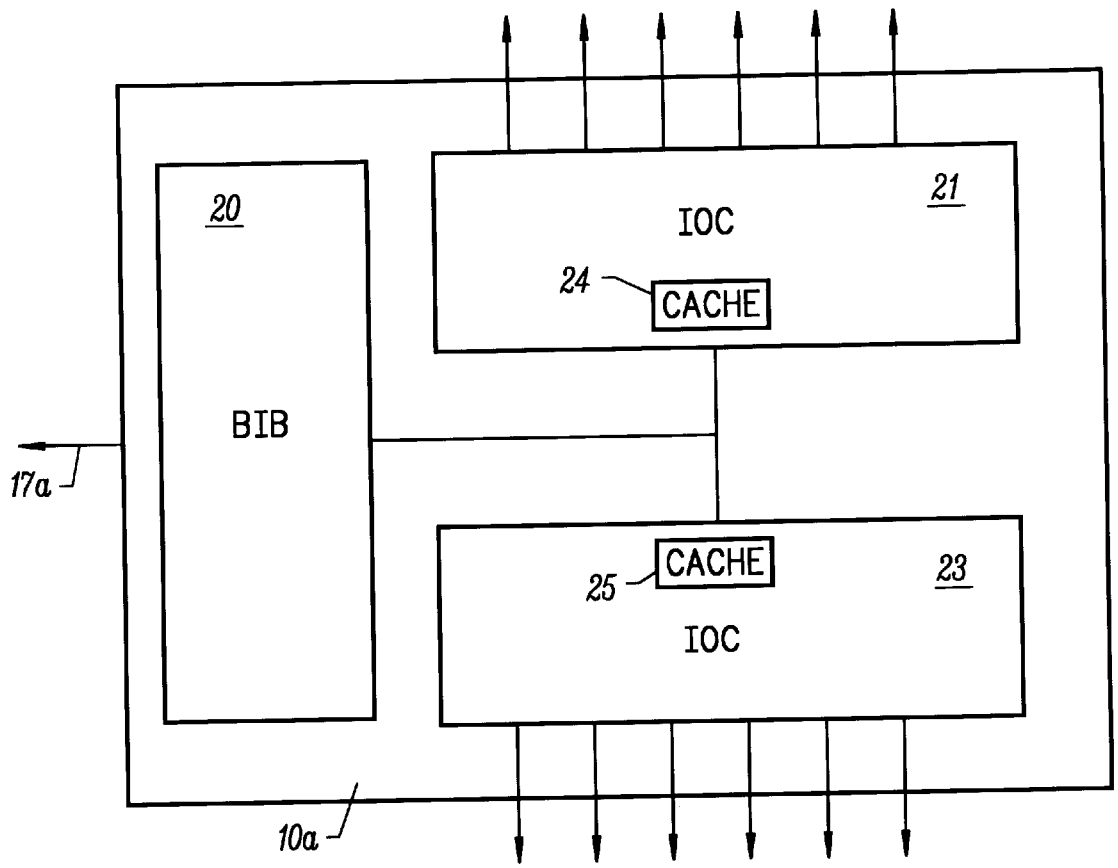
FIG. 2 is a block schematic diagram of an I/O adapter according to the invention.

FIG. 2 is a block schematic diagram of an I/O adapter according to the invention. The I/O adapter includes a bus interface block 20 that buffers transactions, responding to the protocol on the system bus. Within the I/O adapter provided in the presently preferred embodiment of the invention, there are two separate I/O controllers 21/23. Each of the I/O controllers supports a plurality of interfaces to PCI buses. It should be appreciated that the invention may be readily practiced in systems in which the I/O adapter has a different structure and organization.

Figure 3:
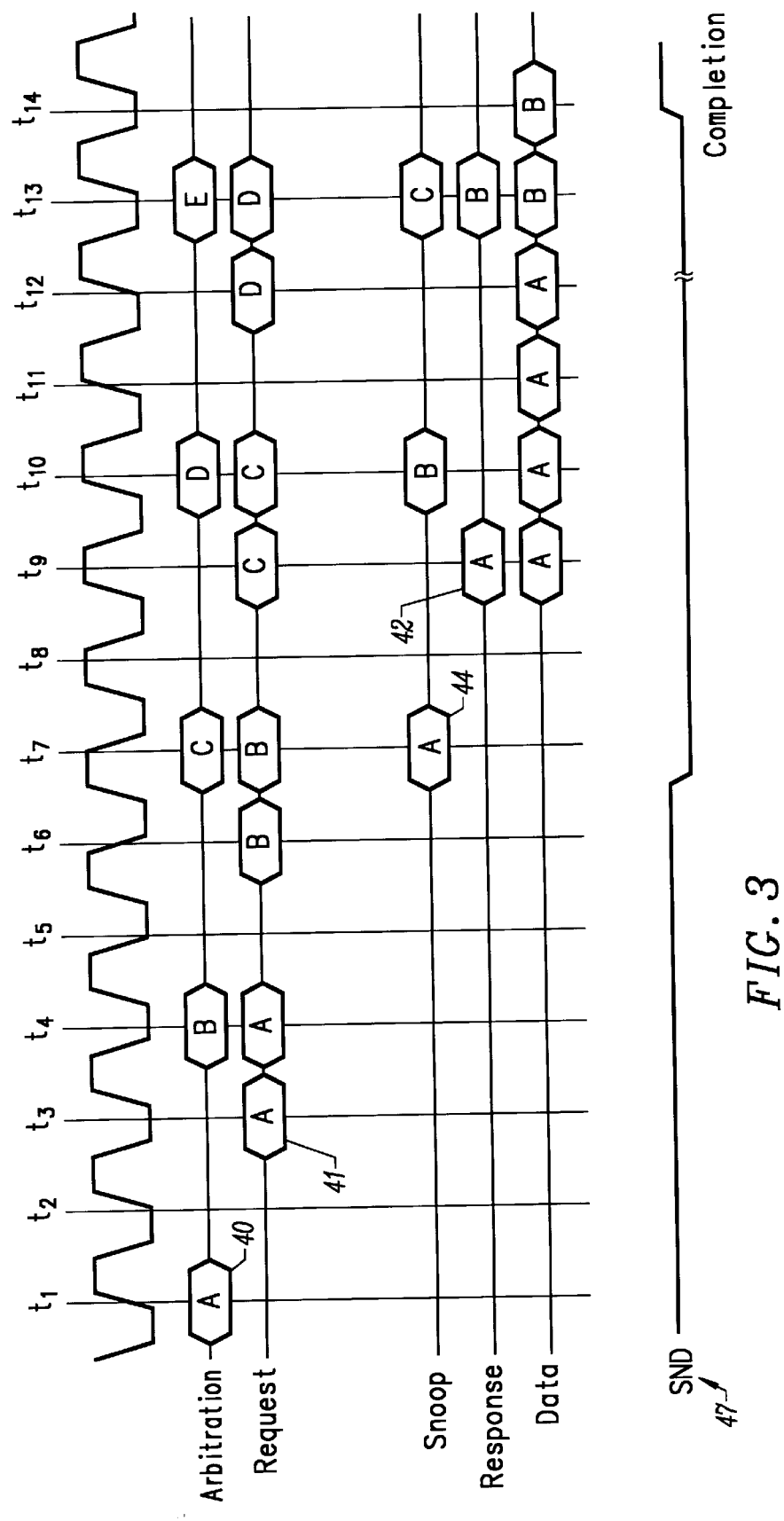
FIG. 3 is a flow diagram showing a DMA_SYNC transaction, including an SND signal, according to the invention.

FIG. 3 is a timing diagram showing a DMA_SYNC transaction, including an SND signal, according to the invention. In FIG. 3, in each group of signals on the system bus handles a different transaction phase. This design allows transactions to be overlapped and fully pipelined. The bus of the preferred embodiment of the invention consists of several groups of signals, including arbitration, address, data and response signals. Each group conducts its business independently and in parallel with the others, allowing bus transactions to be overlapped. Transactions can be fully pipelined, much like instruction execution in a pipelined processor.

FIG. 3 shows how this pipelining works. The first group of signals handles arbitration 40. In FIG. 3, arbitration for the first transaction ("A") occurs in cycle one ($t_1$). During cycle two, all processors analyze the arbitration results and agree on which is the master for the next transaction. At $t_3$, the master asserts the address on the request bus 41, followed by supplemental information in the next cycle. By this time, arbitration for the next transaction ("B") is already under way on the arbitration bus.

In the meantime, bus devices have been checking to see if the address hits in their caches; at $t_7$, these devices use the snoop signals 44 to indicate a hit, in which case data may be returned by the snooping device rather than by the original target. If there are no snoop hits, the target device uses the response bus at time $t_9$ to indicate whether this transaction has completed successfully 42. If so, data is transmitted on the data bus starting in that same cycle.

Note that, by this time, the arbitration bus is already up to transaction D. At full speed, a 64-byte read takes twelve cycles to complete but uses the data bus for only four of those cycles. With the other buses forging ahead, the data bus can be fully used for long periods of time. In this way, three or four transactions can be in progress at once. The preferred bus supports up to twelve transactions at once, which can occur if devices throttle the bus to extend the transaction latency.

A system in accordance with the preferred embodiment of the invention supports an OR tied protocol where, for different signals, any module on the bus can assert a signal. The SND signal is electrically active low, and any or all of the modules can drive the SND signal to an electrically low state. Only when none of the modules are driving the SND signal to a low level does the signal have an electrically high state. The SND signal 47 (FIG. 3) uses the OR tying capability of the system. In the response phase, the system can provide in-order data (in the data phase) or the system can either defer or retry, as opposed to supplying data in order.

The first four phases are performed in pipeline order, while the SND signal is a special case as far as its use is concerned because, in general, there is support in the system for one DMA_SYNC transaction at a time. Therefore, if a DMA_SYNC transaction is issued, at the snoop phase, the SND signal continues to be asserted until the DMA_SYNC transaction is completed, although other transactions may proceed. This particular transaction continues outside of the pipeline. The DMA_SYNC transaction goes through the rest of the phases, but the SND signal continues to be asserted until an associated DMA is complete, i.e. data are moved from the cache to the memory.

While a stall is relative to coherency results, SND is a separate signal. At the snoop phase, coherency results are received. If there is a DMA_SYNC transaction, the SND signal is generated. Ideally, the coherency results complete quickly, and the system goes on to the next phase. As discussed above, SND (and REMSND) are propagated over a separate signal path that is associated with the user bus DMA_SYNC transaction. The SND signal is not used by other transactions, and the rest of the phases continue even though SND is still being asserted. When the coherency results are completed, the transaction proceeds to the response phase. Because transactions proceed in a pipeline, the system can now allow later transactions to go through their snoop phase and get to their data phase.

In the preferred embodiment of the invention, a DMA input, also referred to as a DMA write, is accomplished when the I/O adapter performing a coherent read to gain ownership of a memory line, overwrites the path within the cache, and then performs a write-back to memory. This process is repeated until a complete DMA is processed. At that point, the operating system is notified that the DMA is completed. The system issues a notification that the DMA was completed. There are typically three ways that this can occur:

There is an external interrupt, which may be provided as a transaction that is produced by the I/O adapter;

The processor accesses a register on a PCI card and gets the status of that register to determine if a DMA is complete;

There is an area of memory reserved as a status read, where an I/O device can write into that location, such that the processor can use a coherent read to see the updated value of that status write.

Although the processor sees any of the foregoing indications that the DMA is complete, there is no guarantee that the data can actually be accessed for the purpose of non-coherent read. Accordingly, the system software executes an instruction that causes DMA_SYNC transaction to make sure that any data that is waiting to be posted in the caches finishes getting posted before the processor continues.

The transaction traverses the pipeline normally. It goes through the snoop phase and an SND signal is dispatched. The DMA_SYNC transaction then continues through the rest of the pipeline, and other transactions continue going through the pipeline normally. However, the SND is no longer attached to the pipeline. Thus, the SND signal provides an asynchronous mode of operation in which the SND signal path is released when the information of interest is out of the cache and is up in the memory. At that point, the information is available by reading memory in a normal fashion. In a two bus system, the memory controller asserts the SND signal on the originating bus at least until the snoop phase on the remote bus. In this way, the system can determine whether the REMSND from the remote bus is being asserted.

Until that time, the memory controller asserts the SND, assuming that there is a transaction proceeding on the remote bus. Once the transaction reaches the snoop phase on the remote bus, the memory controller propagates the results of REMSND back to the local SND signal path. Once all I/O adapters on the remote bus release REMSND, the memory controller releases the local SND signal path. Separately, the local I/O adapters stop asserting the local SND signal path when they have flushed the necessary cache lines. Whichever signal comes later, i.e. SND or REMSND, determines when the issuing processor finally sees the results as being complete. The processor can then start issuing code reads to memory.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for ensuring data consistency between an I/O channel and a processor in a computer system having a memory, comprising the steps of:
    broadcasting a DMA_SYNC transaction to all I/O channels within said computer system when notification of a DMA completion is received, said DMA_SYNC transaction further comprising the steps of:
    instructing said I/O channel to enforce coherency; and responding only after coherency has been ensured; and
    providing a reporting means to indicate when said DMA_SYNC transaction is completed;
    wherein said DMA_SYNC transaction instructs said I/O channel to enforce coherency and then responds back only after coherency has been ensured, and wherein said DMA_SYNC transaction is splittable.

2. The method of claim 1, further comprising the step of:
    responsive to said DMA_SYNC transaction, each said I/O channel writing back to said memory any modified lines in an I/O channel cache that might contain DMA data for a DMA sequence that was reported by said system as completed.

3. The method of claim 1, wherein said DMA_SYNC transaction does not have to complete in pipeline order, and wherein said I/O channel can issue new transactions before responding to said DMA_SYNC transaction.

4. The method of claim 1, wherein said reporting means is a separate sideband reporting means that permits said computer system to operate in pipeline order.

5. The method of claim 1, said computer system comprising a multiple bus architecture having a memory controller arranged between a first bus and at least a second bus, wherein each bus includes any of a processor and an I/O adapter.

6. The method of claim 1, further comprising the step of:
    providing a SyncNotDone (SND) signal that is asserted via said reporting means to indicate when said DMA_SYNC transaction is initiated and that is deasserted when said DMA_SYNC transaction is completed.

7. The method of claim 6, further comprising the steps of:
    said processor issuing said DMA_SYNC transaction; and
    responsive thereto, said I/O channel issuing a write-back;
    wherein, when said write-back is to the point that said memory is is responsible for said DMA_SYNC transaction, said I/O channel releases said SND, thereby indicating that said DMA_SYNC transaction is completed.

8. The method of claim 1, wherein said computer system comprises a multiple bus system that supports multiple DMA_SYNC transactions at the same time, where one DMA_SYNC transaction originates from a first bus and at least one other DMA_SYNC transaction originates from another bus.

9. The method of claim 8, wherein said processors watch while there is an active DMA_SYNC transaction that was started from its own bus and do not launch a new DMA_SYNC transaction until that particular DMA_SYNC transaction is completed.

10. The method of claim 8, further comprising the step of:
    providing two reporting means;
    wherein one of said reporting means is provided for a locally issued DMA_SYNC transaction; and
    wherein the other of said reporting means is provided for a remote of issued DMA_SYNC transaction.

11. The method of claim 8, further comprising the step of:
    providing a SyncNotDone (SND) signal that is asserted via said one reporting means to indicate when said DMA_SYNC transaction is initiated and that is deasserted when a local bus DMA_SYNC transaction is completed;
    providing a RemoteSyncNotDone (REMSND) signal that is asserted via said other reporting means to indicate when said DMA_SYNC transaction is initiated and that is deasserted when a remote bus DMA_SYNC transaction is completed; and
    providing means for propagating a REMSND signal from said remote bus to a SND signal path on said local other bus.

12. An apparatus for ensuring data consistency between an I/O channel and a processor in a computer system having a memory, comprising:
    a processor for broadcasting a DMA_SYNC transaction to all I/O channels within said computer system when notification of a DMA completion is received, wherein said DMA_SYNC transaction instructs said I/O channel to enforce coherency; and responds only after coherency has been ensured; and
    a reporting means to indicate when said DMA_SYNC transaction is completed;
    wherein said DMA_SYNC transaction instructs said I/O channel to enforce coherency and then responds back only after coherency has been ensured.

13. The apparatus of claim 12, wherein responsive to said DMA_SYNC transaction, each said I/O channel writes back to said memory any modified lines in an I/O channel cache that might contain DMA data for a DMA sequence that was reported by said system as completed.

14. The apparatus of claim 12, wherein responsive to said DMA_SYNC transaction, each I/O channel only writes back to said memory completely overwritten lines in an I/O channel cache that might contain DMA data for a DMA sequence that was reported by said system as completed.

15. The apparatus of claim 12, wherein said DMA_SYNC transaction does not have to complete in pipeline order, and wherein said I/O channel can issue new transactions before responding to said DMA_SYNC transaction.

16. The apparatus of claim 12, wherein said reporting means is a separate sideband reporting means that permits said computer system to operate in pipeline order.

17. The apparatus of claim 12, said computer system further comprising:
    a multiple bus architecture having a memory controller arranged between a first bus and at least a second bus, wherein each bus includes any of a processor and an I/O adapter.

18. The apparatus of claim 12, wherein a SyncNotDone (SND) signal is asserted via said reporting means to indicate when said DMA_SYNC transaction is initiated and is deasserted when said DMA_SYNC transaction is completed.

19. The apparatus of claim 18, wherein said processor issues said DMA_SYNC transaction and, responsive thereto, said I/O adapter, where appropriate, issue at least one write-back; and wherein, when said write-back is to the point that said memory is responsible for said DMA_SYNC transaction, said I/O adapter releases said SND, thereby indicating that said DMA_SYNC transaction is completed.

20. The apparatus of claim 12, wherein said computer system comprises:

a multiple bus system that supports one DMA_SYNC transaction from each bus at the same time.

21. The apparatus of claim 20, wherein said processors watch while there is an active DMA_SYNC transaction that was started from a local bus and do not launch a new DMA_SYNC transaction until a previous DMA_SYNC transaction from said local bus is completed.

22. The apparatus of claim 20, further comprising:

multiple means;

wherein one of said reporting means is provided for a local DMA_SYNC transaction; and wherein at least one other reporting means is provided for a remote DMA_SYNC transaction.

23. The apparatus of claim 20, further comprising:

a SyncNotDone (SND) signal that is asserted via said one reporting means to indicate when said DMA_SYNC transaction is initiated and that is deasserted when a local bus DMA_SYNC transaction is completed;

a RemoteSyncNotDone (REMSND) signal that is asserted via said other reporting means to indicate when said DMA_SYNC transaction is initiated and that is deasserted when a remote bus DMA_SYNC transaction is completed; and means for propagating a REMSND signal from said remote bus to a SND signal path on said local other bus.

* * * * *